US008662851B2

(12) United States Patent
Izadi

(10) Patent No.: US 8,662,851 B2
(45) Date of Patent: Mar. 4, 2014

(54) METHOD OF MANUFACTURING A TURBINE ROTOR

(71) Applicant: Hamilton Sundstrand Corporation, Windsor Locks, CT (US)

(72) Inventor: Said Izadi, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/673,355

(22) Filed: Nov. 9, 2012

(65) Prior Publication Data

US 2013/0064672 A1 Mar. 14, 2013

Related U.S. Application Data

(63) Continuation of application No. 12/288,278, filed on Oct. 17, 2008, now Pat. No. 8,356,980, which is a continuation-in-part of application No. 11/973,560, filed on Oct. 9, 2007, now abandoned.

(51) Int. Cl.
*F03B 3/12* (2006.01)
(52) U.S. Cl.
USPC .................. 416/213 R; 416/241 R; 415/200; 415/216.1; 29/889.21
(58) Field of Classification Search
USPC ............... 416/213 R, 241 R; 415/200, 216.1; 29/889.2, 889.21
See application file for complete search history.

(56) References Cited

U.S. PATENT DOCUMENTS

| 3,571,906 | A | 3/1971 | Barth et al. |
| 3,763,549 | A | 10/1973 | Bonneville et al. |
| 4,096,615 | A | 6/1978 | Cross |
| 4,270,256 | A | 6/1981 | Ewing |
| 5,161,950 | A * | 11/1992 | Krueger et al. ........... 416/204 R |
| 5,240,167 | A | 8/1993 | Ferte et al. |
| 5,460,317 | A | 10/1995 | Thomas et al. |
| 5,652,389 | A | 7/1997 | Schaps et al. |
| 5,829,664 | A | 11/1998 | Spinella et al. |
| 6,324,831 | B1 | 12/2001 | Izadi et al. |
| 6,478,545 | B2 * | 11/2002 | Crall et al. ................ 416/213 R |
| 6,637,642 | B1 | 10/2003 | Lingnau |
| 6,666,653 | B1 | 12/2003 | Carrier |
| 6,736,305 | B2 | 5/2004 | Foster et al. |
| 6,969,238 | B2 | 11/2005 | Groh et al. |
| 7,080,770 | B2 | 7/2006 | Lovin et al. |

(Continued)

FOREIGN PATENT DOCUMENTS

EP 1526252 A2 4/2005

OTHER PUBLICATIONS

European Patent Office, European Search Opinion, Mar. 4, 2009, 7 pages.

(Continued)

*Primary Examiner* — Igor Kershteyn
(74) *Attorney, Agent, or Firm* — Kinney & Lange, P.A.

(57) ABSTRACT

A method for joining a cast metal material blade ring and a metal material hub structure into a turbine rotor. One of the blade ring and the hub structure is mounted in a holder and the other is mounted in a rotation holder for being rotated. At least one of these mountings is heated, and then they are pressed together with a selected force while rotating to weld the ring interior wall and the disk side to form the assembled structure.

14 Claims, 4 Drawing Sheets

(56) References Cited

U.S. PATENT DOCUMENTS

| | | |
|---|---|---|
| 7,121,448 B2 | 10/2006 | Subramanian et al. |
| 7,156,277 B2 | 1/2007 | Ishikawa et al. |
| 7,322,508 B2 | 1/2008 | Chang et al. |
| 2006/0049235 A1 | 3/2006 | Lovin et al. |

OTHER PUBLICATIONS

European Patent Office, Extended European Search Report, Jan. 22, 2010, 10 pages.

* cited by examiner

METHOD OF MANUFACTURING A TURBINE ROTOR

CROSS-REFERENCE TO RELATED APPLICATION(S)

This application is a continuation of application Ser. No. 12/288,278, filed Oct. 17, 2008, which is a continuation-in-part of application Ser. No. 11/973,560, filed Oct. 9, 2007, entitled "METHOD OF MANUFACTURING A TURBINE ROTOR". All references are incorporated herein.

BACKGROUND

The present invention relates to gas turbine engines and, more particularly, to turbine rotors used therein.

Gas turbine engines are commonly used for aircraft propulsion and for powering various devices located in aircraft or in ground vehicles or a variety of ground installations (by generating electrical power or compressed air). Such engines in essence have, beginning from the engine atmospheric air inlet, a compressor arrangement having rotatable compressor rotors therein followed by a combustor arrangement for receiving the generated compressed air to add fuel thereto and ignite same. The remaining air and combustions products are hot gases, characterized by high temperatures and pressures, which exit the engine through a turbine arrangement having rotatable turbine rotors therein and thereafter through the exit nozzle to the atmosphere. In doing so, the turbine rotors are forced to rotate and, because of being mechanically coupled to the compressor rotors, these latter rotors are also forced to rotate as are any devices that are also mechanically coupled to the turbine rotors. In aircraft engine applications, the escaping hot gases also provide thrust for propulsion.

The turbine, in addition to rotors with a sequence of radially extending shaped blades about the periphery thereof, has corresponding sequences of circularly arrayed vanes with each such sequence provided in a stationary vane structure located between successive rotors. These vanes stabilize and direct the flows of hot gases from one rotor to the next in a manner seeking to optimize the work extracted from those gases in rotating the turbine rotors. Higher temperatures and pressures in the hot gases passing through the vanes and rotor blades permits extracting greater energy therefrom in turning the rotor blades to thereby increase engine efficiency.

However, operating at such increased temperatures and pressures requires materials in structures in the turbine subjected to such hotter gases to able to operate at such temperatures and pressures at the operational rotation speeds encountered. This includes the rotor blades maintaining their mechanical resistance to the stresses thereon due to such hot, pressurized impinging gases by resisting distortion, stretching, elongation or other forms of metal creep, and resisting wear and corrosion due to those gases or other substances entering the engine inlet airflow. One class of materials found suited for such blades has been forming them arrayed about the outer periphery of a ring in a unitary structure made of cast, sometimes directionally solidified, nickel-base superalloys. These bladed rings are joined at the interior of the ring in the ring opening to a rotor core disk, or hub, suited for being mounted on a rotatable shaft or tube and are typically formed of forged high strength superalloys, which may again be nickel-base superalloys. The material used must also have good low and high cycle fatigue properties, good corrosion resistance and good ductility at room and elevated temperatures. This joining of the bladed ring to a corresponding rotor core disk is typically provided through diffusion bonding of the one to the other in a vacuum furnace for diffusion bonding. However, such furnaces and their operation are costly. Thus, there is a desire for another method for joining together such turbine rotor components and the rotor so formed.

SUMMARY

The present invention provides a method for joining a cast metal material blade ring, and a metal material hub structure. The blade ring has blades arrayed about the outer periphery of a ring and an initial interior ring passageway at an inner periphery of the ring formed by a ring interior wall thereabout that extends between concentric initial passageway openings of differing diameters at opposite ends of this passageway. The metal material hub structure has a disk part thereof with a disk side configured such that at least a portion of a disk side is positionable against a portion of the ring interior wall through one of the initial passageway openings so as to be assembleable into an assembled structure for a turbine rotor through mounting one of the blade ring and the hub structure in a holder to present same for joining to the other and also mounting the remaining one of the blade ring and the hub structure in a rotation holder for being rotated by a rotatable portion of that rotation holder to present same for joining to the other.

The application of heat to one or both surfaces, such as by induction heater, laser or other means of applying heat, substantially reduces the amount of inertia required in the next step. Much larger surfaces can be treated in this method.

These mountings are followed by pressing at least the portion of the ring interior wall of the blade ring and the portion of the disk side of the hub structure disk part together with a selected force while the rotatable portion of the rotation holder is rotating for a sufficient time to weld together the ring interior wall and the disk side to thereby form the assembled structure. This is true for inertia welds as wells as other friction welding techniques.

DETAILED DESCRIPTION

Figure 1A:
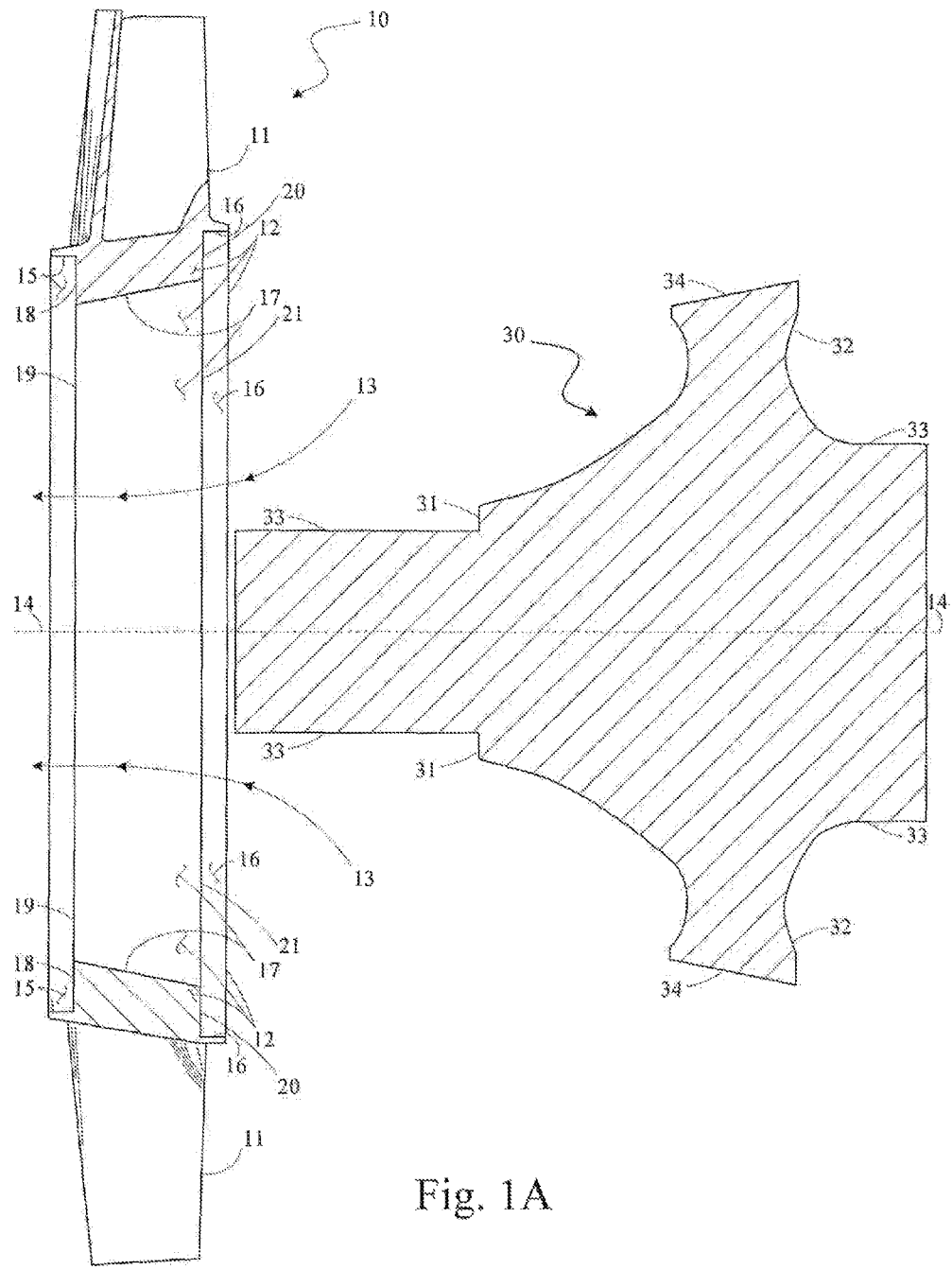
FIG. 1A shows cross section side views of individual members to be joined together in the providing a turbine rotor.

FIG. 1A shows a cross section side view of an example of a bladed ring, 10, with blades, 11, arrayed about the outer periphery of a ring, 12, typically formed in a cast, perhaps directionally solidified, unitary structure made of a suitable material like a nickel-base superalloy such as commercially available INCO 792 from INCO Limited. Bladed ring 10 is formed around an initial interior passageway, 13, extending in three sections through ring 12 along an axis of symmetry thereof, 14. Initial interior passageway 13 has a smaller recessed side opening section with a circular wall thereabout, 15, at one end thereof and a larger recessed side opening section with a circular wall thereabout, 16, thereabout at the other end thereof.

Between these two side openings therein, initial interior passageway 13 has a central section with a circular wall, 17, providing an interior end surface, 18, at the periphery of the smaller one of the two recessed passageway side opening sections, the one having circular wall 15 thereabout. End surface 18 is formed outside of a circular opening, 19, that is provided there as access to the central section of initial interior passageway 13 from that smaller recessed side opening section of that passageway. Opening 19 to the central section has a diameter less than that of circular wall 15.

From there, central section circular wall 17, in bounding the central section of initial interior passageway 13, has a diameter that increases, shown linearly increasing, along axis 14 until reaching the larger one of the two recessed side opening sections, the one having circular wall 16 thereabout. There, central section circular wall 17 again provides an interior end surface, 20, outside of a further circular opening, 21, that is provided there for access to the central section of initial interior passageway 13 from this larger recessed side opening section of that passageway. That is, central section circular wall 17 extends along axis 14, and concentrically thereabout, with a changing diameter between the two circular openings 19 and 21 thereto, also provided concentrically about that axis. Opening 21 has a diameter greater than that of opening 19 but less than that of circular wall 16 to thereby provided end surface 20. Central section circular wall 17 is machined to have surface extents therein, i.e. line elements therein, that project onto that axis at a desired angle, termed the ring boundary wall surface angle, and to have a desired total surface area.

Also shown in a cross section side view in FIG. 1A is an example of a typically forged, or wrought, or possibly cast, rotor metal hub preform, 30, typically formed of a suitable material like a nickel-base superalloy such as commercially available INCO 718 from INCO Limited. The outer surface of hub preform 30 can be shaped to provide the needed surface shape features that are acceptable for use thereafter without too great a precision in the location or shape thereof, or both, through providing them during the forging or casting process used in providing perform 30. Such a shape feature is shown for example as a raised surface wall, 31, symmetrically provided about axis 14 that has been extended in FIG. 1A from initial interior passageway 13 of bladed ring 10 through perform 30 as the axis of symmetry therefore also.

Those surface shape features that must be provided with precision as to location or shape will typically have to be provided by machining, or, alternatively provided first as a started feature through forging or casting, at later adjusted by machining, to reach a final acceptable shape. One such feature requiring a precision shape is a disk portion, 32, which is that portion of hub preform 30 having the largest lateral extent with respect to axis 14 in being provided there about a shaft coupling portion, 33, of hub preform 30. There, a disk side surface, 34, must be machined to have surface extents therein, i.e. line elements therein, that project onto that axis at a desired angle, termed the disk side surface angle. The angle that is desired for the disk side surface angle is that angle that substantially matches the ring boundary wall surface angle of central section circular wall 17 about initial interior passageway 13 in bladed ring 10 selected above. Also, the total surface area of disk side surface 34 is desired to substantially match that of central section circular wall 17.

Prior to forming an inertia or friction weld between disk side surface 34 and circular wall 17, one or both of these surfaces is heated to a temperature below the melting point of the metal. For example, but not by way of limitation, aluminum would be heated to less than about 212° F. (100° C.) whereas titanium or a nickel super alloy would be heated to less than about 1800° F. (982° C.). The actual temperature to which the surfaces are heated will depend on a number of factors, including but not limited to: the size of the surface being welded, the materials being welded, the rotational speed of the welding device turns the part being rotated, and the weight that the welding device can add to increase the inertia of the part being rotated. One or both surfaces can be heated to within 1000° F. (538° C.) of its melting point, and preferably to within 700° F. (371° C.) of its melting point. A minimum temperature that can be used has not been determined since these machines have operated at room temperature and it is desirable to obtain the maximum benefit from the application of heat to the surfaces.

Heating can be accomplished using any conventional heating device that can apply sufficient heat to the surface or surfaces being heated, without contamination by combustion products or the like. Induction heating has been found to be very effective. Laser heating is also clean and effective. Another example of a heater is a torch.

Thus provided, prepared and heated, bladed ring 10 and hub perform 30 are joined together, after positioning ring boundary wall surface angle of central section circular wall 17 against disk side surface 34, and welded to one another to form a bond over the areas of those two surfaces, which provides the resulting bond area. Such welding is a joining process that allows avoiding use of an expensive vacuum furnace, as previously used in diffusion bonding these parts, and the relatively long corresponding heating and cooling times. Preheating of the parts can be used to enhance the welding process such as through controlling the weld cooling rate.

This welding is typically accomplished by holding one of bladed ring 10 and preform hub 30 stationary with the other of them being rotated while applying a force along axis 14, about which both are concentrically positioned, so as to force them against one another where they meet at central section circular wall 17 and disk side surface 34. Typically, bladed ring 10 is positioned in a static holder that holds it stationary during the welding process with axis 14 extending from initial interior passageway 13 thereof through hub preform 30 coinciding with the rotation axis of a rotatable spindle on which hub preform 30 is mounted in a rotation holder. The two holders allow bringing stationary bladed ring 10 and rotatable hub preform 30 against one another at central section circular wall 17 and disk side surface 34 with a selected pressing force, and rotating hub preform 30 in that arrangement at least initially at a selected rate of rotation. The amount of pressing force, and the rotation rate depend on the size chosen for the bond area, the nature of the material chosen in forming each of bladed ring 10 and hub 30, and the value chosen for both the ring boundary wall surface angle and the disk side surface angle.

Figure 1B:
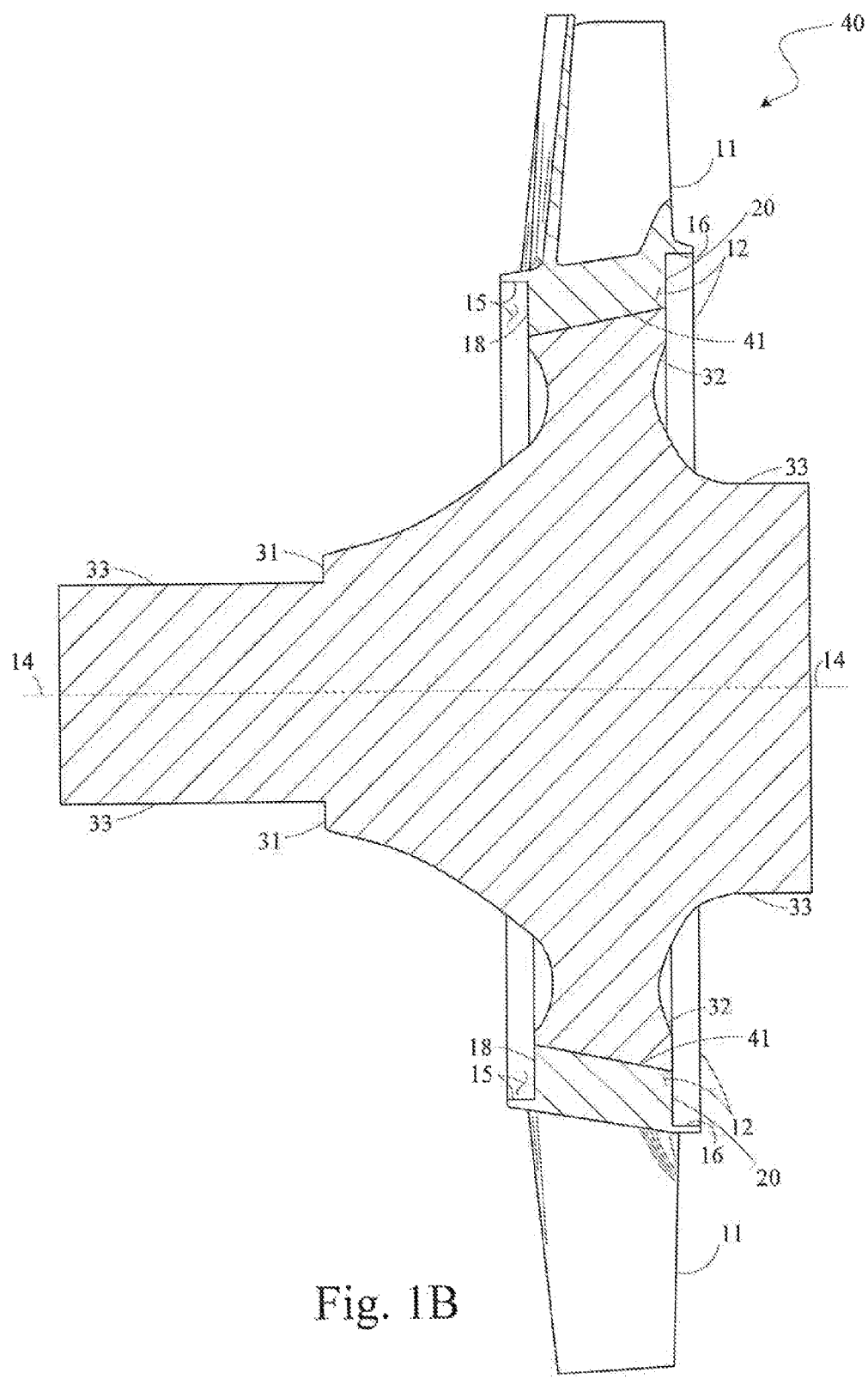
FIG. 1B shows a cross section side view of the members in FIG. 1A as subsequently joined together.

A preferred form of welding is inertia welding that uses stored kinetic energy. This invention substantially improves inertia welding but is also effective on other forms of friction welding. This welding process allows selecting the energy input going into forming the weld through spinning hub 30 up to a selected rate before forcing it against bladed ring 10 with a selected lineal force to thereby obtain a good quality welded joint. This process aids in getting repeatable results for each such welded joint made. The heating from the frictional force between these two parts, after being brought together following the spinning of hub 30, leads to a plastic deformation at the interface between the parts and the formation of atomic bonds at the interface to join these two parts together, all without melting the metals in central section circular wall 17 and disk side surface 34 at the welding interface. The result is an intermediate rotor assembly, 40, shown in FIG. 1B with a welding bond, 41, over the bonding area at what were previously exposed surfaces, that is, central section circular wall 17 and disk side surface 34 in FIG. 1A.

It has been found that the inclusion of a heating step as described above has provided significant and surprising results. Specifically, it has been found that much larger parts can be combined in this manner than those inertia welded at room temperature. For example, prior hub diameters of 3.5 inches (8.9 cm and approximately 12 square inches or 77.5 cm$^2$) have been successfully inertia welded Also, these larger pieces are welded using the method of this invention with machines that are limited in the speed of rotation, such as 5,000 rpm. The weight that can be added in weight disks (to increase the inertia of the rotating part) is limited too, such as about 400 to 500 pounds (180 to 227 kg.).

Figure 2:
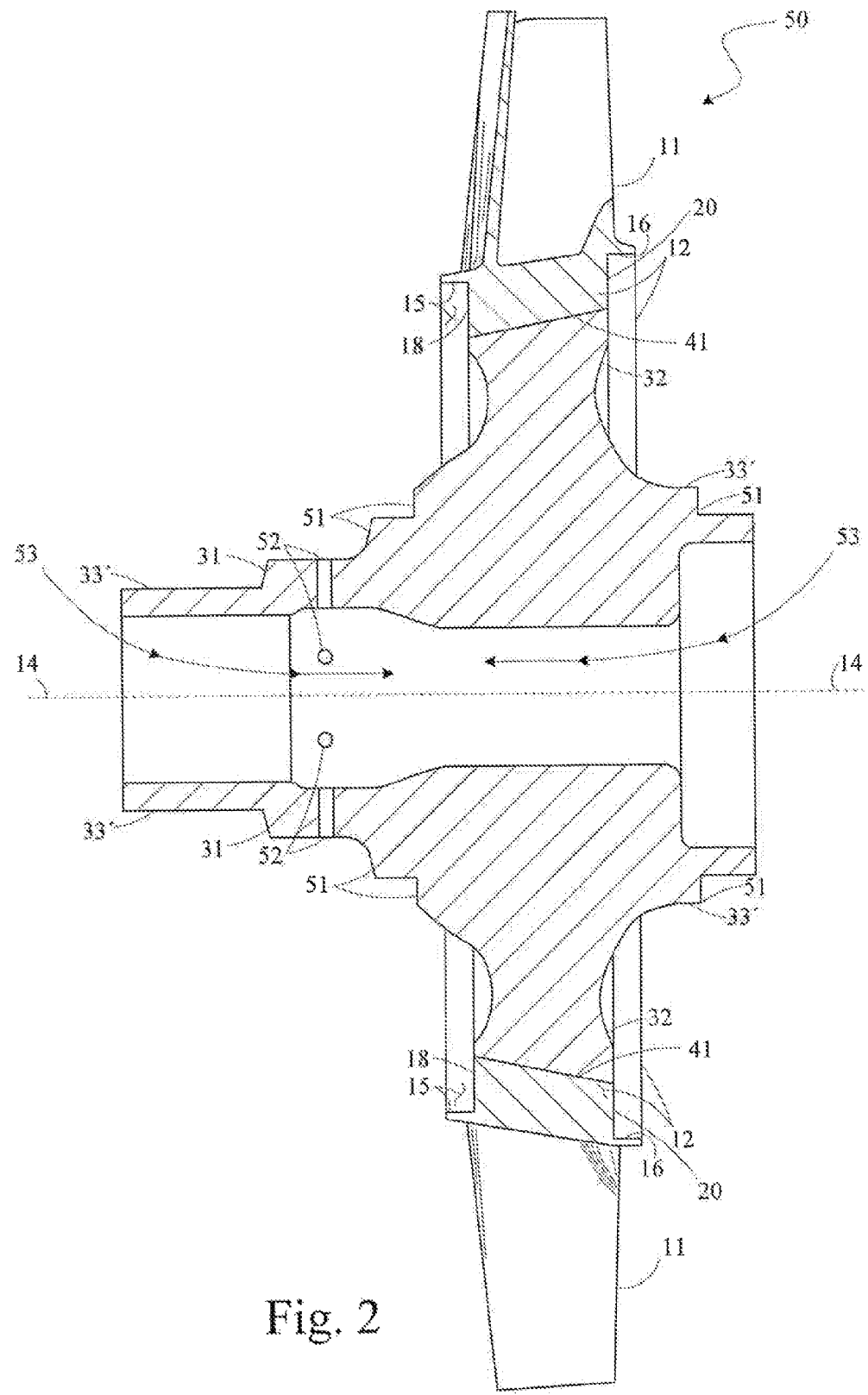
FIG. 2 shows a cross section side view of a completed turbine rotor following suitable processing of the joined members of FIG. 1B.

Intermediate rotor assembly 40 is thereafter subjected to various finishing processes including a substantial amount of machining to provide a finished rotor. Such a finished rotor, 50, is shown in FIG. 2. There, shaft coupling portion 33 in FIGS. 1A and 1B has been redesignated 33' as machining has altered its external shape by adding further raised walls, 51, therein. Lubrication ports, 52, have been drilled therein to provide access to a shaft accommodation passageway, 53, bored through shaft coupling portion 33' in this example of a finished rotor.

Figure 3:
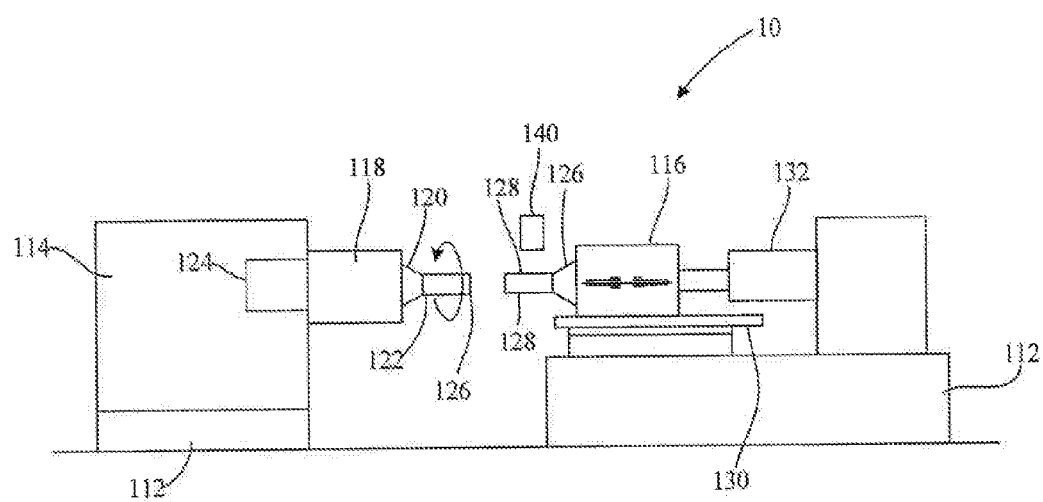
FIG. 3 shows an inertia welding machine of the type used to produce the rotor of FIG. 2.

FIG. 3 illustrates an inertial friction welding machine of a type described in detail in U.S. Pat. No. 7,080,770, assigned to Manufacturing Technology, Inc. of South Bend, Indiana, the disclosure of which is incorporated herein in its entirety. The machine, 100 generally, is a friction welder 112 and includes a headstock portion 114 and a tailstock portion 116. The headstock portion includes a spindle 118 having a rotating chuck 120 for engaging a first work part or component 122. A drive 124 such as a motor is configured to apply a torque to the spindle 118 to rotate the spindle via commands from a motion controller, not shown. The spindle 118 may be equipped with additional mass, such as a flywheel, to increase the moment of inertia of the rotating part.

The tailstock portion 116 includes a non-rotating chuck 126 for engaging a second work part 128. The tailstock portion 116 mounts to a slide 130 wherein a slide actuator 132 slides the non-rotating chuck 126 toward the rotating chuck 120. Since the rotating chuck 120 and the non-rotating chuck 126 engage the first component 122 and the second component 128, respectively, the first component 122 and the second component 128 contact each other as described above with respect to the rotor. First and second components 122 and 128 represent the central section circular wall 17 and disk side surface 34 of FIGS. 1A, 1B and 2, and are heated using heater 140. As discussed above, heater 140 can be any heater that applies heat directly to the surface, such as an induction heater, laser heater, torch and the like.

Although the present invention has been described with reference to preferred embodiments, workers skilled in the art will recognize that changes may be made in form and detail without departing from the spirit and scope of the invention.

The invention claimed is:

1. A turbine rotor formed of a cast metal blade ring, including blades arrayed about its outer periphery and a frustoconical inner periphery, and a metal hub including an accommodation passageway centered about an axis of rotation, lubrication ports extending from the accommodation passageway to the exterior of the metal hub, and a disk part radially outward from the accommodation passageway with a disk side configured such that at least a portion of the disk side is positioned against a portion of the inner periphery and joined together by an inertial friction weld formed by inertial friction welding after heating at least one of the portion of the disk side and the portion of the inner periphery wall to a temperature of about (1000° F.) 538° C. less than the melting point of the portion.

2. The rotor of claim 1 wherein both a ring interior wall of the blade ring and the hub disk part are heated to an temperature of about (1000° F.) 538° C. less than the melting point of the surface.

3. The rotor of claim 1 wherein at least one of a ring interior wall of the blade ring and the hub disk part is heated to a temperature of about (700° F.) 371° C. less than the melting point of the surface.

4. The rotor of claim 1 wherein the blade ring comprises a directionally solidified or conventional casting.

5. The rotor of claim 1 wherein the blade ring is made of a nickel base superalloy.

6. The rotor of claim 1 wherein the metal hub is formed of forged or cast metal.

7. The rotor of claim 1 wherein the metal hub is made of a nickel base superalloy.

8. The rotor of claim 1 wherein the hub includes a passageway through a shaft coupling part thereof about which the disk part is provided with the passageway extending substantially perpendicular to a plane extended through corresponding points in each of the blades.

9. A turbine rotor comprising:
a cast metal blade ring including blades arrayed about an outer periphery and having a frustoconical inner periphery; and
a metal hub including a first disk part with a frustoconical outer periphery that is mated with, and joined by an inertial friction weld to, the frustoconical inner periphery of the blade ring, the metal hub including a second disk part that is frustoconical and adjoins a first side of the first disk part, wherein the second disk part includes an annular stair-step portion on an outer surface of the second disk part adjacent to the first disk part.

10. The turbine rotor of claim 9 wherein the inertial friction weld is a weld formed by preheating at least one portion of the frustoconical inner periphery of the blade ring or the frustoconical outer periphery of the first disk part of the metal hub to a temperature of about (1000° F.) 538° C. less than a melting point of the portion, followed by inertial friction welding of the frustoconical inner periphery of the blade ring to the frustoconical outer periphery of the first disk part of the metal hub.

11. The turbine rotor of claim 9 wherein the blade ring is a directionally solidified casting.

12. The turbine rotor of claim 9 wherein the blade ring is formed of a nickel base superalloy.

13. The turbine rotor of claim 12 where in the metal hub is formed of a nickel base superalloy.

14. The turbine rotor of claim 13 wherein the metal hub is a directionally solidified casting.

* * * * *